US011204844B2

(12) United States Patent
Fruchtman et al.

(10) Patent No.: US 11,204,844 B2
(45) Date of Patent: Dec. 21, 2021

(54) FILE LEVEL ACCESS TO BLOCK LEVEL INCREMENTAL BACKUPS OF A VIRTUAL DISK

(71) Applicant: International Business Machines Corporation, Armonk, NY (US)

(72) Inventors: Michael S. Fruchtman, San Jose, CA (US); Avishai H. Hochberg, San Jose, CA (US); Vadzim I. Piletski, San Jose, CA (US); James P. Smith, Redwood City, CA (US)

(73) Assignee: International Business Machines Corporation, Armonk, NY (US)

( * ) Notice: Subject to any disclaimer, the term of this patent is extended or adjusted under 35 U.S.C. 154(b) by 14 days.

(21) Appl. No.: 16/539,831

(22) Filed: Aug. 13, 2019

(65) Prior Publication Data

US 2019/0370117 A1    Dec. 5, 2019

Related U.S. Application Data

(63) Continuation of application No. 15/195,840, filed on Jun. 28, 2016, now Pat. No. 10,417,098.

(51) Int. Cl.
*G06F 11/00* (2006.01)
*G06F 11/14* (2006.01)

(52) U.S. Cl.
CPC ...... *G06F 11/1458* (2013.01); *G06F 11/1448* (2013.01); *G06F 11/1451* (2013.01); *G06F 11/1469* (2013.01); *G06F 2201/815* (2013.01)

(58) Field of Classification Search
None
See application file for complete search history.

(56) References Cited

U.S. PATENT DOCUMENTS

| 8,132,162 | B2 | 3/2012 | Peterson |
| 8,140,537 | B2 | 3/2012 | Elrom et al. |

(Continued)

FOREIGN PATENT DOCUMENTS

| EP | 2713271 B1 | 8/2015 |
| WO | 2007/002397 A2 | 1/2007 |
| WO | 2015/057509 A1 | 4/2015 |

OTHER PUBLICATIONS

Weijun Xiao et al., "A Case for Continuous Data Protection at Block Level in Disk Array Storages", Parallel and Distributed Systems, IEEE Transactions on. Jun. 2009; 20 (6):898-911.

(Continued)

*Primary Examiner* — Midys Rojas
(74) *Attorney, Agent, or Firm* — Kunzler Bean & Adamson

(57) ABSTRACT

For accessing files from block-level backups of a virtual disk, a system, method, computer program product and apparatus are disclosed. The system includes an apparatus with a changed block module that determines changed blocks between a previous and a current block-level backup of a virtual disk. A mapping module maps logical clusters of the virtual disk to the changed blocks and identifies files corresponding to the logical clusters. A changed file module designates files corresponding to the logical clusters as changed files, unless current attributes of files for the current backup match attributes of the files in a backup file index corresponding to the previous backup. The changed file module stores the current attributes and extents for changed files within blocks of a backup storage device for updating in the backup file index. The method and computer program product perform these functions and may use the system and the apparatus.

20 Claims, 6 Drawing Sheets

(56) References Cited

U.S. PATENT DOCUMENTS

| | | | |
|---|---|---|---|
| 8,200,638 B1 | 6/2012 | Zheng et al. | |
| 9,152,638 B1 | 10/2015 | Naftel | |
| 9,766,825 B2* | 9/2017 | Bhagi | G06F 3/0665 |
| 10,191,906 B1* | 1/2019 | Whitmer | G06F 11/1458 |
| 10,503,605 B2* | 12/2019 | Fang | G06F 11/1451 |
| 2004/0268068 A1 | 12/2004 | Curran et al. | |
| 2015/0220402 A1 | 8/2015 | Cantwell et al. | |
| 2015/0254141 A1 | 9/2015 | Wertheimer et al. | |
| 2016/0004721 A1 | 1/2016 | Iyer et al. | |
| 2016/0070623 A1 | 3/2016 | Derk et al. | |
| 2017/0220427 A1* | 8/2017 | Fu | G06F 3/06 |

OTHER PUBLICATIONS

Dilip Nijagal Simha et al., "A Scalable Deduplication and Garbage Collection Engine for Incremental Backup" In Proceedings of the 6th International Systems and Storage Conference Jun. 30, 2013 (p. 16). ACM.

Marcia Kubo et al., Backing up Microsoft SQL Server with IBM Tivoli Storage Manager, Redbooks, IBM.com/redbooks, Jun. 2008, pp. 1-310.

Neeta Garimella, Understanding and exploiting snapshot technology for data protection, Part 1, http://www-128.ibm.com/developerworks/tivoli/library/t-snaptsm1/index.html, Apr. 26, 2006, pp. 1-8.

Charlotte Brooks et al., "Using IBM Tivoli Storage Manager to Back Up Microsoft Exchange with VSS", IBM Redbooks, ibm.com/redbooks, Oct. 2006, pp. 1-202.

Del Hoobler et al., "Using Tivoli Storage Manager for performing VSS operations", https://www.ibm.com/developerworks/tivoli/library/t-tsm-vss/index.html?S_TACT=105AGX14&S_CMP=EDU, Jan. 12, 2009, pp. 1-13.

* cited by examiner

FILE LEVEL ACCESS TO BLOCK LEVEL INCREMENTAL BACKUPS OF A VIRTUAL DISK

CROSS-REFERENCE TO RELATED APPLICATIONS

This application is a continuation of and claims priority to U.S. patent application Ser. No. 15/195,840 entitled "FILE LEVEL ACCESS TO BLOCK LEVEL INCREMENTAL BACKUPS OF A VIRTUAL DISK" and filed on Jun. 28, 2016, for Michael S. Fruchtman, et al., which is incorporated herein by reference in its entirety.

BACKGROUND

Virtual machines may access data in virtual disks in a virtual machine environment. Virtual disks may provide a virtual representation of physical storage devices that enables operating systems to access virtual disks in ways similar to ways to access physical devices. A backup program may back up data on virtual disks. IBM® Tivoli® Storage Manager ("TSM"), also referred to as IBM® Spectrum Protect™, offloads the backup workloads from the system hosting the virtual machines to a virtual storage (vStorage) backup server.

SUMMARY

An apparatus to access files from block-level backups of a virtual disk is disclosed. In one embodiment, the apparatus includes a changed block module that obtains a list of changed blocks for a current backup of a virtual disk. The list of changed blocks indicates data blocks of the virtual disk that have changed since a previous backup of the virtual disk. The apparatus includes a mapping module that maps logical clusters of the virtual disk to the changed blocks and identifies files corresponding to the logical clusters.

In one embodiment, the apparatus further includes a changed file module that designates the files corresponding to the logical clusters as changed files, unless current attributes of the files for the current backup match attributes of the files in a backup file index corresponding to the previous backup of the virtual disk. The changed file module further stores the current attributes of the changed files for updating in the backup file index. The changed file module further stores extents of the changed files within blocks of a backup storage for updating in the backup file index.

A method for accessing files from block-level backups of a virtual disk is disclosed. In one embodiment the method includes obtaining a list of changed blocks for a virtual disk, the list indicating data blocks of the virtual disk that have changed since a previous backup of the virtual disk. The method further includes identifying logical clusters corresponding to the changed blocks. The method further includes designating files corresponding to the logical clusters as changed files, unless current attributes of the files match attributes of the files in a backup file index corresponding to the previous backup. The method further includes storing the current attributes of the changed files for updating in the backup file index and storing extents of the changed files within blocks of a backup storage for updating in the backup file index.

A computer program product that performs the functions of the method is disclosed. In one embodiment, the computer program product includes a computer readable storage medium having program instructions embodied therewith, the program instructions readable/executable by a processor to cause the processor to obtain a changed block list for a virtual disk, the changed block list indicating data blocks changed since a previous backup of the virtual disk. In one embodiment, the program instructions cause the processor to identify logical clusters corresponding to the changed blocks.

In one embodiment, the program instructions cause the processor to designate files corresponding to the logical clusters as changed files, unless current attributes of the files match previous attributes of the files in a backup file index corresponding to the previous backup. In one embodiment, the program instructions cause the processor to store the current attributes of the changed files for updating in the backup file index and to store extents of the changed files within blocks of a backup storage for updating in the backup file index.

BRIEF DESCRIPTION OF THE DRAWINGS

In order that the advantages of the embodiments of the invention will be readily understood, a more particular description of the embodiments briefly described above will be rendered by reference to specific embodiments that are illustrated in the appended drawings. Understanding that these drawings depict only some embodiments and are not, therefore, to be considered to be limiting of scope, the embodiments will be described and explained with additional specificity and detail through the use of the accompanying drawings, in which.

DETAILED DESCRIPTION

Figure 1:
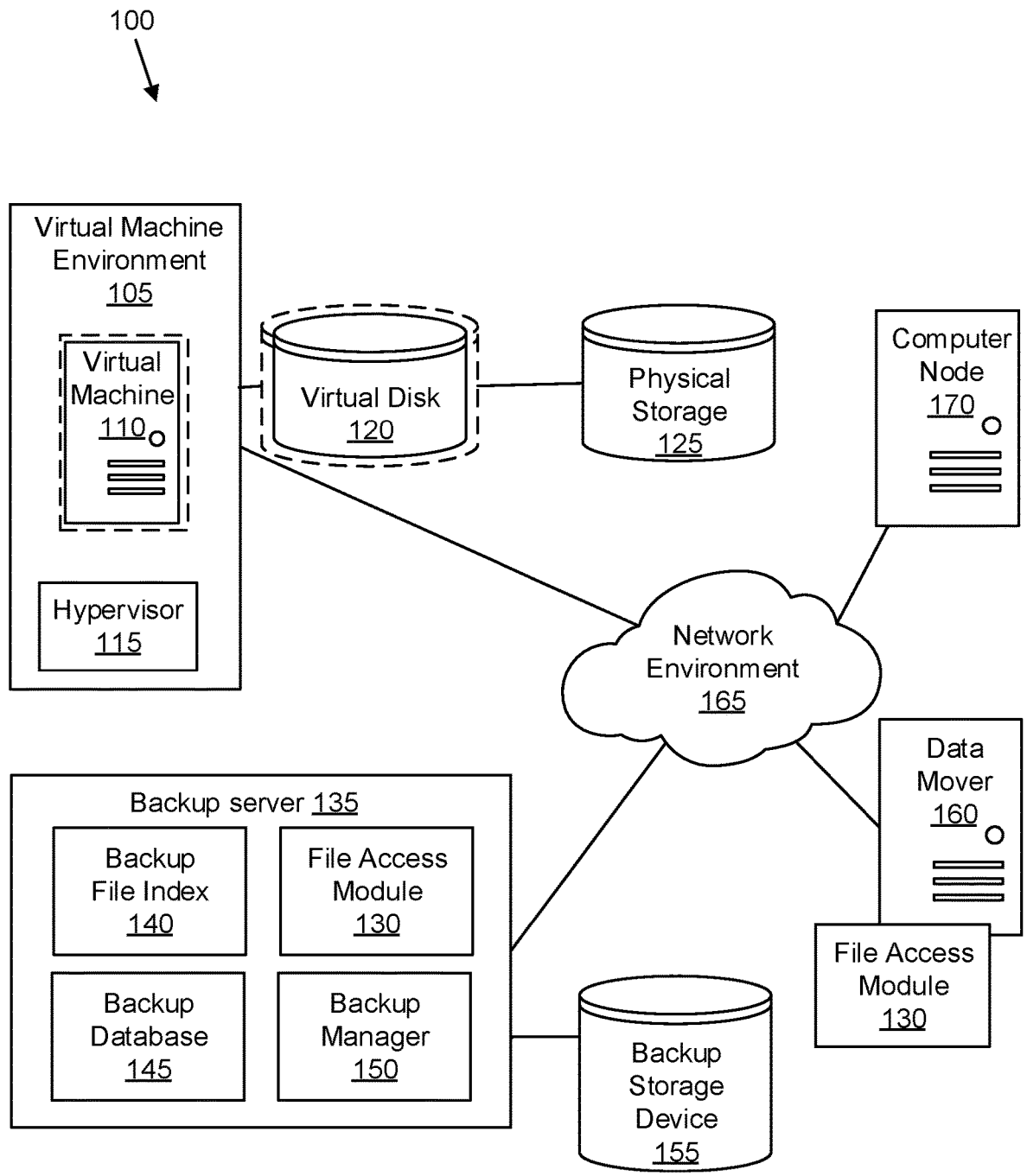
FIG. 1 is a schematic block diagram illustrating a computing environment for backing up and accessing backup data for a virtual machine.

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to" unless expressly specified otherwise. An enumerated listing of items does not imply that any or all of the items are mutually exclusive and/or mutually inclusive unless expressly specified otherwise. The terms "a," "an," and "the" also refer to "one or more" unless expressly specified otherwise.

Furthermore, the described features, advantages, and characteristics of the embodiments may be combined in any suitable manner. One skilled in the relevant art will recognize that the embodiments may be practiced without one or more of the specific features or advantages of a particular embodiment. In other instances, additional features and advantages may be recognized in certain embodiments that may not be present in all embodiments.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory ("RAM"), a read-only memory ("ROM"), an erasable programmable read-only memory ("EPROM" or Flash memory), a static random access memory ("SRAM"), a portable compact disc read-only memory ("CD-ROM"), a digital versatile disk ("DVD"), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine-dependent instructions, microcode, firmware instructions, state-setting data, or either source code or object code written in any combination of one or more programming languages, including an object-oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or another device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field-programmable gate arrays, programmable array logic, programmable logic devices or the like.

Modules may also be implemented in software for execution by various types of processors. An identified module of program instructions may, for instance, comprise one or more physical or logical blocks of computer instructions which may, for instance, be organized as an object, procedure, or function. Nevertheless, the executables of an identified module need not be physically located together but may comprise disparate instructions stored in different locations which, when joined logically together, comprise the module and achieve the stated purpose for the module.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

FIG. 1 is a schematic block diagram illustrating a system 100 for backing up and accessing backup data for a virtual machine. In some embodiments, system 100 includes a virtual machine ("VM") environment 105. In the virtual machine environment 105, a hypervisor 115 creates and runs one or more virtual machines 110. Virtual machine 110 accesses data in one or more virtual disks 120, which provide a virtual representation of physical storage 125 devices. In some embodiments, virtual machine environment 105 communicates with other systems such as data mover 160 through a network environment 165.

In one embodiment, virtual machine environment 105 is part of a cloud computing virtualization platform, such as vSphere® from VMware®. In some embodiments, a computer node 170 communicates with the virtual machine environment 105 and/or the backup server 135 through network environment 165.

In one embodiment, the system 100 includes one or more file access modules 130 that enable a backup manager 150 to provide file-level access to block-level backup data for a virtual disk 120. File-level access means that a module, program, or user may access the backup data as a file even though the backup data from virtual disk 120 is backed up at the block level (i.e. blocks of data are copied from virtual disk 120 to backup storage device 155, rather than scanning and copying files from virtual disk 120 to backup storage device 155 file by file. In some embodiments, system 100 includes one or more backup servers 135. For example, in some embodiments, data mover 160 is considered a backup server 135. In some embodiments, backup servers 135 and data mover 160 are separate machines. A backup server 135 may have a backup manager 150 installed.

A backup manager 150 manages the backup of the virtual disk 120. For example, in some embodiments, a backup manager 150 such as IBM® Tivoli® Storage Manager ("TSM") also referred to as IBM® Spectrum Protect™, offloads the backup workloads from the system (not shown) hosting the virtual machines to the backup server 135. In some, embodiments, a backup manager client of backup manager 150 is installed on the backup server 135. The backup manager 150 sends a request to the data mover 160 to transfer data to perform operations such as copying and transferring in the backing up of virtual disk 120.

In some embodiments, backup manager 150 reduces the amount of data needed to represent a backup version by utilizing change block tracking to identify blocks that have changed between a previous backup and a current backup to create backup versions. The term current, as used herein, refers to a point in time that a backup is made or in other words at the time of a snapshot. For example, current backup refers to a backup made at a specified point in time. The terms current blocks, current files, current attributes refer to the blocks, files, and attributes at the time of a current backup. The term previous, as used herein, refers to a point in time of a latest backup made prior to the current backup. There are no backups made between a previous backup and a current backup.

In a full backup, all of the allocated blocks of virtual disk 120 are copied to backup storage device 155. In an incremental backup, blocks of virtual disk 120 that have changed since a full backup or a previous incremental backup are copied to backup storage device 155. In some embodiments, backup manager 150 uses the change block tracking mechanism to carry out an "incremental forever" backup. The term forever in the term incremental forever refers to the fact that incremental backups may occur indefinitely without the need for periodic full backups.

In some embodiments, an incremental forever backup minimizes backup windows (i.e. the length of time it takes to perform a backup) since less data is being transferred. Likewise, utilizing incremental forever backup technology may also provide faster recovery of data. Rather than scheduling weekly (periodic) full backups, an incremental forever backup utilizes one initial full backup. Afterward, an ongoing (forever) sequence of incremental backups occurs. In some embodiments, an incremental forever backup reduces the amount of data that goes across the network compared to full backups or compared to periodic incremental backups.

Using incremental forever backup may also reduce data growth, i.e. growth in the total amount a backup data storage needed because an incremental forever backup includes only the blocks that changed since the previous backup with no need for periodic full backups. Moreover, no comparison with the backup target e.g. virtual disk 120 is needed since only changed blocks are identified. In some embodiments, there is no need to schedule an initial full backup as a separate schedule: the first issue of an incremental forever backup automatically defaults to an incremental forever full backup.

Incremental backup of individual files requires the backup system to find backup candidate files. Finding files eligible for incremental backup may require a full file system scan. For example, finding all the files in a volume to be backed up by comparing the current attributes of the files with the previous attributes of the files. Full file system scans may be prohibitively expensive because of the large number of files.

For example, a scan (with full security attributes) of tens of millions of files can take hours. The sheer number of files that must be processed before an incremental backup and the amount of time necessary to do a full file system scan has pushed backup users to prefer to perform block-level backups which may provide significant speed advantages over file-level backups with full file system scans.

One approach for restoring a backup copy of a file from a virtual machine backup involves mounting (using an iSCSI mount) a backed-up virtual machine disk and exporting the mounted volume for a file-level restore operation. This may require a user to expand a list of VMware® datacenters (vCenters™) and select a virtual machine from a navigation pane. Depending on the number of managed vCenters™, the list might take a few moments to load. A user may then select from the list one or more restore points for one virtual machine in the table and then mount the virtual machine disks which include the file(s) to be restored. With the whole file system represented to the user through the iSCSI® mount, the user may then pick the files to be restored and then copy them to a selected destination and dismount the volume. However, this approach handles only one snapshot at a time and may require a wait for the mount to be effectuated.

Some backup systems utilize file journal techniques which track changes made of files in a file journal. The journal keeps track of the changes on file system while the system is running. At backup time the journal is used as a source of files eligible for backup. Journals can be provided by an operating system (OS). For example, the Windows® operating system provides access to an OS file system journal. TSM journal-based backup uses this functionality. One issue with OS journals, such as the Windows® system journal is that it may miss file system updates. Moreover, a backup application may not have detected that a file system update (e.g. a change in files) has occurred or has been missed. Accordingly, OS journaling backup systems may need to periodically perform file system scan-based file-level incremental backups, i.e. directly scanning a virtual disk to find files that have changed between a previous backup and a current backup and copying the changed files to a backup storage device.

Alternatively, journals that track changes to files may be included in a storage device. An example of a storage-device-provided journal is NetApp® storage. NetApp® provides a way to get a list of changed files between backup without doing a file system scan. A backup system that relies on file change journals requires calls to a storage vendor-specific API. For example, NetApp® APIs may not work in with devices made by other storage vendors. Moreover, in most cases VMs do not have raw access to NetApp® storage, thus making it impracticable to use NetApp® file journaling approach in such environments.

Another possible file-level incremental backup approach is the use of a file system filter driver. A file system filter driver may intercept and process changed blocks on the fly and provide a list of changed files. Running a filter driver on a hypervisor host uses some of the available processing of the host and thus may impact performance. Some file systems, for example, ZFS®, designed by Sun Microsystems®, may provide a list of files changed between snapshots. Yet, such file systems may have a relatively small number of users, thus making them less preferable for widespread application.

In some embodiments, system 100 performs each incremental backup at specified point-in-time. A point-in-time backup is also known as a snapshot. Backup manager 150 manages the blocks that are incrementally captured to produce multiple recovery points of the entire virtual machine to the end-user. In some embodiments, a backup database 145 generally maintains backup information including a record of data blocks that have been backed up and provide address information for the backup copies of the data blocks.

In one embodiment, the backup file index 140 generally includes information about the attributes, versions, and locations of changed files within the changed blocks that have been copied to the backup storage device 155. It will be noted that references to deleting, updating, designating or performing any operation to files in the backup file index 140 refer to deleting, updating, designating or performing any operation to records corresponding to files as the files themselves are located on the virtual disk 120 and/or the backup storage device 155.

In some embodiments the backup file index 140 is part of the backup database 145. In another embodiment, the backup file index 140 is linked to the backup database 145. It will be understood that records described as included in the backup file index 140 may instead or in addition to, be included in backup database 145. In some embodiments, backup database 145 includes a full list of the names of current files on virtual disk 120 that is updated when a current backup is performed. Getting the names of the files on virtual disk 120 is a very quick operation for example by using an update sequence number (USN) change journal data.

In some embodiments, the backup times of the current files are updated in the backup database when a current backup is performed. Backups of files made at different times may be referred to as different versions of the files. Thus, a full list of files and their versions is available in backup database 145. In some embodiments, file access module 130 may access the current list of files in the backup database 145 without mounting the virtual disk 120 as a volume. Including a full list of files and their versions in backup database 145 facilitates fast and easy searching for particular versions of particular files without needing to mount a view of either the backup storage device 155 or the virtual disk 120 in order to perform the search.

Figure 2:
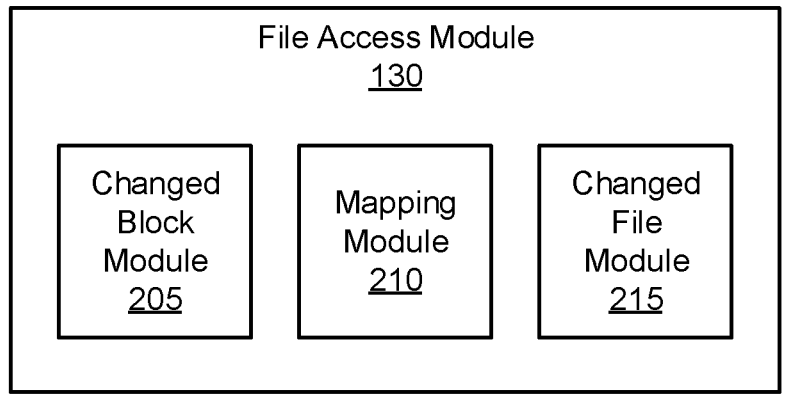
FIG. 2 is a schematic block diagram illustrating one embodiment of a file access module.

FIG. 2 is a schematic block diagram illustrating one embodiment of an apparatus 200 for accessing files from a block-level backup of a virtual disk. The apparatus 200 includes an embodiment of the file access module 130 that includes a changed block module 205, a mapping module 210, and a changed file module 215, that transforms block-level backup information for virtual disk 120 into file-level backup information by transforming block-level information to cluster information and by transforming cluster information to file information and comparing current and previous file attributes. While the modules 205, 210, 215 are depicted in the file access module 130, in some embodiments, some or all of the modules 205, 210, 215 may be located elsewhere and may be implemented in various ways, such as hardware circuits, executable code, etc., and may be implemented using a combination of executable code combined with hardware circuits.

The apparatus 200, in one embodiment, includes a changed blocked module 205 that that obtains a list of changed blocks for a virtual disk 120. The changed block list indicates those data blocks of the virtual disk that have changed since a previous backup of the virtual disk 120. In one embodiment, changed block module 205 utilizes changed block tracking (CBT). Changed block tracking keeps track of blocks that have changed between a previous backup and a current backup. Thus a significant amount of time can be saved by backing up only changed blocks, rather than backing up every block of every VM in the infrastructure. In some embodiments, changed block tracking is disabled by default. An administrator can enable changed block tracking and some backup tools, including changed block module 205, can enable it automatically.

In one embodiment, when any blocks were changed since the previous backup, changed block tracking tags them and stores the information, for example, in a CTK (change tracking) file. Changed block tracking tells the vSphere or backup tool to copy these changed blocks, avoiding copies of the entire VM. This reduces the amount of data undergoing backup. In another embodiment, for example, in Microsoft® HyperV® host running Windows 2012® and subsequent versions, all changes since a previous backup are provided as a special file. In some embodiments, changed block module 205 accesses changed block information by reading a change tracking file.

It will be noted that while changed block information can be accessed by changed block module 205 by accessing change tracking files, other methods of obtaining changed block information may be used. In some embodiments, system 100 and file access module 130 operate with changed block tracking that is available on widely used operating systems such as Windows®, OS X®, and Unix®/Linux® and widely used standard file systems such as NTFS (in which clusters can be mapped to files) without requiring special hardware.

In one embodiment, apparatus 200 includes a mapping module 210 that maps logical clusters of a virtual disk to the changed blocks. In one embodiment, each cluster in a volume of a virtual disk has a sequential number referred to as its logical cluster number ("LCN"). LCN zero refers to the first cluster in the volume, e.g. the boot sector. In one embodiment, the mapping module 210 maps logical clusters of the virtual disk by calculating the number of logical clusters per changed block by dividing the changed block size by the cluster size.

In the case of a master boot record disk with an NTFS file system, the changed block offset is converted to a logical cluster offset by subtracting the MBR size from the physical offset and calculating the starting LCN corresponding to the block starting offset provided in the changed block list. In some embodiments, the starting offset is the start of block zero on the backup storage device 155. The mapping module 210 calculates the number of clusters in the block by dividing the block size of the changed block by the cluster size. One example of changed block mapping is described in more detail below with respect to FIG. 4.

The mapping module 210 also identifies files corresponding to the logical clusters. In one embodiment, the mapping module 210 maps the LCN to file identifiers (e.g. file names) by accessing a file system journal. In one embodiment, the mapping module 210 queries the update sequence number ("USN") journal of the drive to get the File Reference IDs, for example using FSCTL_READ_USN_JOURNAL. Other IO control codes provide similar functionality.

The apparatus 200, in one embodiment also includes a changed file module 215 that designates files corresponding to the logical clusters as changed files, unless current attributes of the files match stored attributes of the files in a backup file index 140 corresponding to the previous backup of the virtual disk 120. Because there are typically multiple clusters per block, the fact that a block has changed since the previous backup does not necessarily mean that every cluster within the changed block has changed.

Files are allocated one or more clusters. Changed file module 215 queries the cluster to determine which file "owns" the cluster, i.e., to which file the cluster is allocated if any. Some of the files with clusters allocated that map to changed blocks may not have changed since the previous backup. For example, if the current attributes of a particular file match the stored attributes in a backup file index 140 corresponding to the previous backup, then the file has not changed and need not be included in the list of changed files by changed file module 215.

In one embodiment, changed file module 215 further stores current attributes of files that have changed for updating the backup file index 140. Changed file module further stores extents (offset and length) of the changed files within blocks of a backup storage for updating in the backup file index 140. In some embodiments, the changed block module 205, the mapping module 210, and the changed file module 215, are installed the backup server.

In other embodiments, one or more of the modules 205, 210, 215 may be installed on the backup server. In one embodiment, the changed file module 215 provides a list of the changed files that includes multiple versions of one or more of the changed files that were backed up at different backup times. In some embodiments, a computer node may access the list of the changed files and select multiple versions and/or multiple files to restore together. One embodiment illustrating the format and content of the backup file index 140 is described in more detail below with respect to FIG. 5.

Figure 3:
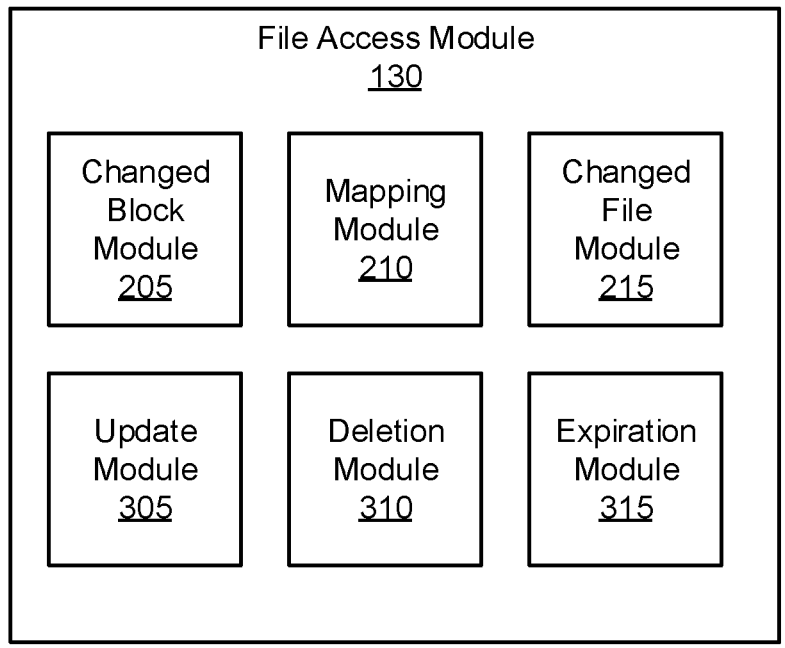
FIG. 3 is a schematic block diagram illustrating another embodiment of a file access module.

FIG. 3 is a schematic block diagram illustrating another embodiment of an apparatus 300 for accessing files from a block-level backup of a virtual disk. In one embodiment, apparatus 300 includes a file access module 130 that includes a changed block module 205, a mapping module 210, and a changed filed module 215 that are substantially the same as described above with respect to FIG. 2.

In one embodiment, apparatus 300 further includes an update module 305 that updates the backup file index 140 with the current attributes of changed files corresponding to the changed blocks. In some embodiments, the update module 305 further includes a deletion module 310 that finds files deleted between a previous backup and a previous backup and updates the backup file index 140 by designating the files deleted as inactive files in the backup file index 140. In some embodiments, the offset and length of the inactive files on the backup storage device 155 are retained in the backup file index 140. Thus, backup manager 150 can restore deleted files from the incremental backups of the blocks on the backup storage device 155 using the block offset information in backup file index 140. More details regarding the function of apparatus 300 are provided below with respect to FIGS. 5 and 7.

In one embodiment, apparatus 300 further include an expiration module 315 that determines whether a snapshot that includes the changed blocks has been deleted from a backup storage disk for exceeding an expiration limit, and further deletes the changed files corresponding to blocks in the expired snapshot from the backup file index 140 in response to the snapshot having been deleted. For example, in one embodiment, when a snapshot is removed from the backup database 145, any files that are in that snapshot, but that are not in subsequent snapshots are removed from backup file index 140.

In one embodiment, the backup manager 150 may be configured to perform a specified number of incremental backups, or to perform incremental backups for a specified period of time, e.g. one incremental backup every day for one week. In some embodiments, the backup manager 150 may cause an expired snapshot to be deleted when a number of snapshots are saved that exceed the expiration limit. When saving a new snapshot of virtual disk 120 will result in storing more than one week's work of snapshots or in the number of snapshots exceeding an expiration limit, the backup manager 150 causes the new snapshot to be stored in backup storage device 155 and expired version of the blocks is deleted from the backup storage device 155 and from the backup database 145.

An expired file, block, or snapshot, is a version of the file, block or snapshot that exceeds an expiration limit. For example, in some embodiments, if the number of block-level backups is limited to three, then a fourth block-level backup would exceed the limit. An expiration limit could also be determined by an expiration date. For example, a backup manager could be configured to store data for a particular period of time, e.g. a month, a year, five years and so forth. Once a backed-up file, block, or snapshot of a volume exceed the specified limit, it may in some embodiments be considered to be expired. Thus, the blocks deleted from the backup storage device 155 and from the backup database 145 are no longer available to access at the file level and may be deleted from the backup file index 140 by expiration module 315.

Figure 4:
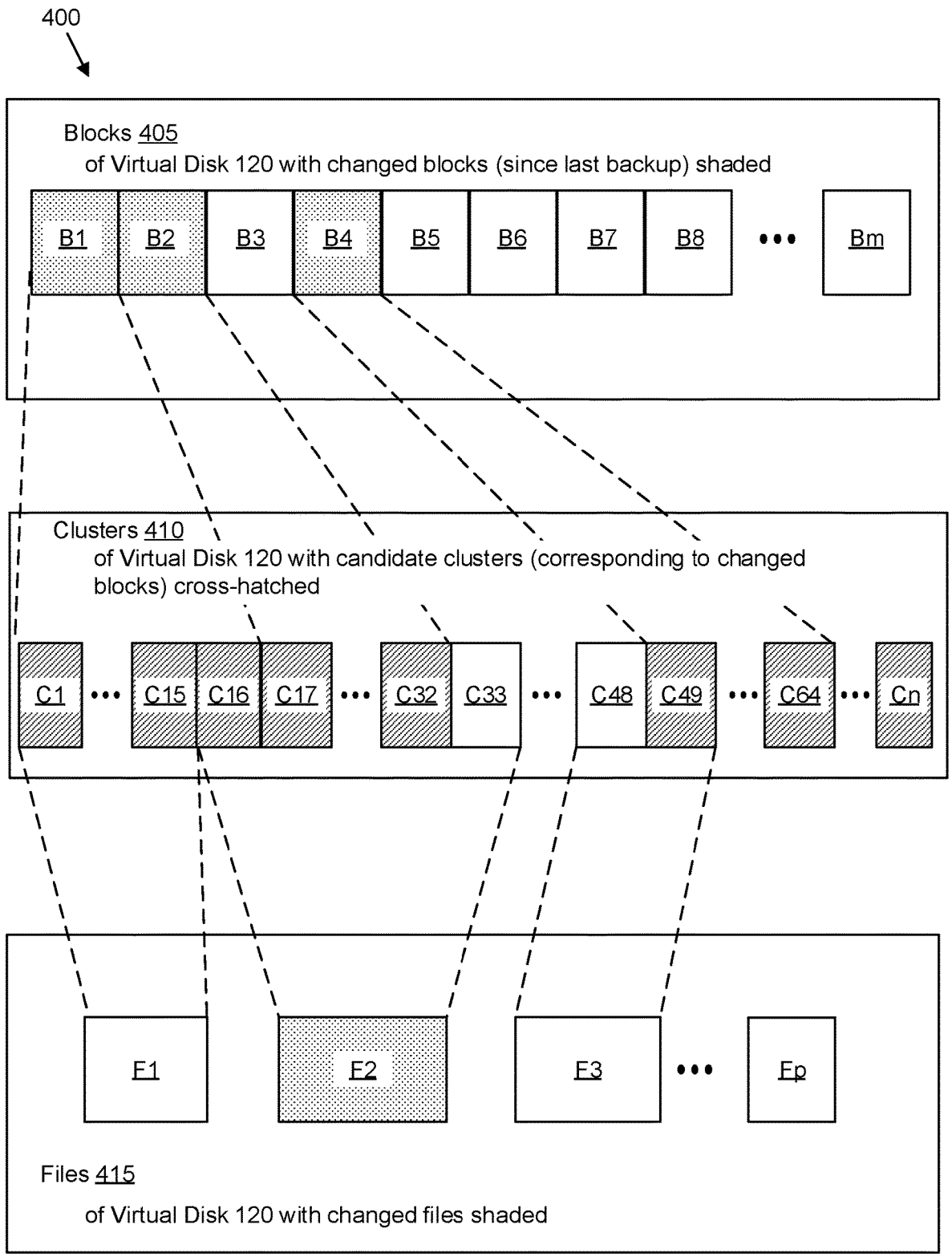
FIG. 4 depicts a virtual disk at backup time as accessed through block-level, cluster-level, and file-level data structures.

FIG. 4 depicts a diagram 400 of a virtual disk at backup time as accessed through block-level, cluster-level, and file-level data structures. In one embodiment, when a file of files 415 changes between a previous backup and a current backup, the change block tracking designates the block or blocks in which the file is found as changed blocks. Some blocks 405 may change without every file 415 found within or partially within blocks 405 having changed. Therefore, the changed block module 205 obtains the list of changed blocks so that the mapping module 210 can map the candidate clusters, i.e. the clusters 410 that may have changed. It will be noted that for simplicity of illustration, files 415 are shown as corresponding to sequential blocks. There is no requirement that the blocks be sequential and files 415 regularly correspond to non-sequential blocks.

The changed file module 215 further designates files corresponding to the changed clusters as changed files unless the current attributes of the files match the previous attributes of files backed up in the previous backup. In some embodiments, block-level backup information obtained by changed block module 205 for a virtual machine 110 in the form of blocks 405, may be transformed by mapping module 210 from a list of changed blocks within a virtual machine file system to a list of clusters 410 corresponding to the blocks that have changed since the previous backup. For every block listed as a changed block, at least one cluster corresponding to the changed block has changed between the previous backup and the current backup. Other clusters may not have changed.

Accordingly, clusters 410 represent candidate clusters that do belong to one or more of blocks 405 that have changed since the previous backup. A candidate cluster may belong to a file that has changed since the previous backup. However, a first cluster may not have changed at all and is merely identified as a candidate cluster because it corresponds to the same block as a second cluster which has changed. From the list of candidate clusters, a list of files 415 corresponding to the candidate clusters may be derived.

By comparing current attributes for the files with previous attributes of files at the time of the previous backup, the files 415 in the list may be designated as changed files if the current file attributes have changed since the previous backup, thus one or more change files may be identified as a file to be restored from a block-level backup by accessing the data of the corresponding clusters within the changed blocks.

During a changed block-based incremental virtual machine backup, block-level backup information including changes made to a VM's virtual disk may be provided to a backup application as a set of one or more extents. In some embodiments, blocks have a fixed length, for example, 64K bytes per extent. In other embodiments, blocks have a variable length so that the length of the extent varies from block to block.

An extent refers to a starting address for a set of data and a length of data e.g. a number of bytes or words of data belonging to the extent. In some embodiments, block-level backup is performed with change block tracking enabled to identify the blocks of the virtual disk that have changed since the previous backup. Thus, in an incremental backup, the start of each changed block and the length of each changed block are recorded in a backup database 145.

For example, FIG. 4 blocks 405 represent the blocks of a virtual disk 120 with changed blocks (i.e. blocks that have changed since the previous backup) shown as shaded. In the example illustrated, blocks B1, B2, and B4 have changed since the last incremental backup, while blocks B3, B5, B6, B7, B8 through Bm have not changed since the previous backup. Thus, blocks B1, B2, and B4 are backed up during incremental backup. In some embodiments, the list of changed blocks may be obtained using a changed block tracking feature of the virtualization software. For example, VMware® includes changed block tracking (CBT) that helps in performing incremental block-level backups.

FIG. 4 further depicts clusters 410 that correspond to blocks 405 within the virtual disk 120. The size of a cluster within clusters 410 is generally operating system and/or file system-dependent and is generally designated at the time of creation or formatting of a virtual disk volume. For example, in a New Technology File System ("NTFS") volume, a default cluster size is generally 4096 (i.e. 4K) bytes. In some embodiments, cluster size is also referred to as allocation unit size. For example, in an NTFS file system, the allocation unit size is generally selected from a set of binary sizes including 512, 1K, 2K, 4K, 8K, 16K, 32K, and 64K bytes.

Thus, in an example depicted in FIG. 4 blocks, 405 of virtual disk 120 have a block size of 64K bytes (i.e. the length of each block extent is 64K bytes). Clusters 410 are depicted as having a cluster size of 4K bytes (i.e. a default allocation unit size of 4096 bytes for each cluster). Accordingly, clusters C1-C16, of 4K bytes each, correspond to block B1 of 64K bytes. Similarly, clusters C17-C32, of 4K bytes each, correspond to block B2 of 64K bytes, while clusters C33-C48 correspond to block B3 and clusters C48-C64 correspond to block B4, and so forth through cluster Cn which is the last cluster corresponding to block Bm of blocks 405.

Clusters C1-C16 are depicted in FIG. 4 as cross-hatched to indicate that they are candidate clusters, i.e., clusters corresponding to blocks that have been listed as changed blocks by the changed block tracking. Accordingly, at least one cluster of clusters C1-C16 includes data that has changed since the last block-level incremental backup. Some of clusters C1-C16 may not actually include data that has changed since the last incremental backup. Thus, clusters C1-C16 are designated as candidate clusters, i.e. clusters that correspond to blocks that have changed since the FIG. 4 also depicts files 415 that have each have one or more clusters 410 allocated. Each cluster includes information about to which file if any, that cluster corresponds. Some clusters do not have any corresponding files allocated to them. For example, in a newly formatted volume, some clusters may be unallocated. Other clusters may be allocated to hidden files or system files. As new files are created, clusters are allocated to the files and as files grow in size, additional clusters may be allocated. As files are deleted, clusters may be deallocated from the deleted file in order to be available for allocation to other files. FIG. 4 depicts clusters C1-C15 as allocated to file F1. Similarly, clusters C16-C33 are allocated to file F2. Cluster C48-C49 are allocated to file F3.

In one embodiment, clusters C1-C15 are allocated to file F1 at backup time. Also at backup time, changed block module 205 obtains a list of changed blocks for virtual disk 120 indicating that block B1 has changed since the previous backup. The mapping module 210 maps block B1 to logical clusters C1-C16. However, this does not mean that each of clusters C1-C16 have changed since the previous backup. Rather, it means that a least one cluster C1-C16 that is mapped to block B1 has changed. The mapping module 210 further identifies file F1 as corresponding to clusters C1-C15, and mapping module 210 identifies file F2 as corresponding to clusters C16-C33, of which clusters C16-C32 map to block B2 which is also in the list of changed blocks, while cluster C33 maps to block B3. Block B3 is not on the obtained list of changed blocks.

Changed file module 215 takes into account that files corresponding to candidate clusters may have changed, but have not necessarily changed. In the example of FIG. 4, file F1 has not changed. Thus, when the changed file module 215 compares current attributes of file F1 at backup time with stored attributes of file F1 in a previous backup, file F1 will not be designated as a changed file. Thus no change to the backup file index 140 will be made for file F1.

The changed file module 215 compares current attributes of the file F2 with attributes of a backed-up version of the file F2. Since the F2 has changed since the previous backup, the attributes of the file F2 will not match the attributes of a backed-up version of the file F2 referenced in the backup file index 140. Thus, in some embodiments, the changed file module 215 designates file F2 as a changed file and updates the backup file index 140 to reflect that file F2 has changed. The file F2 is depicted as shaded meaning that it has changed in some way since the previous backup.

Figure 5:
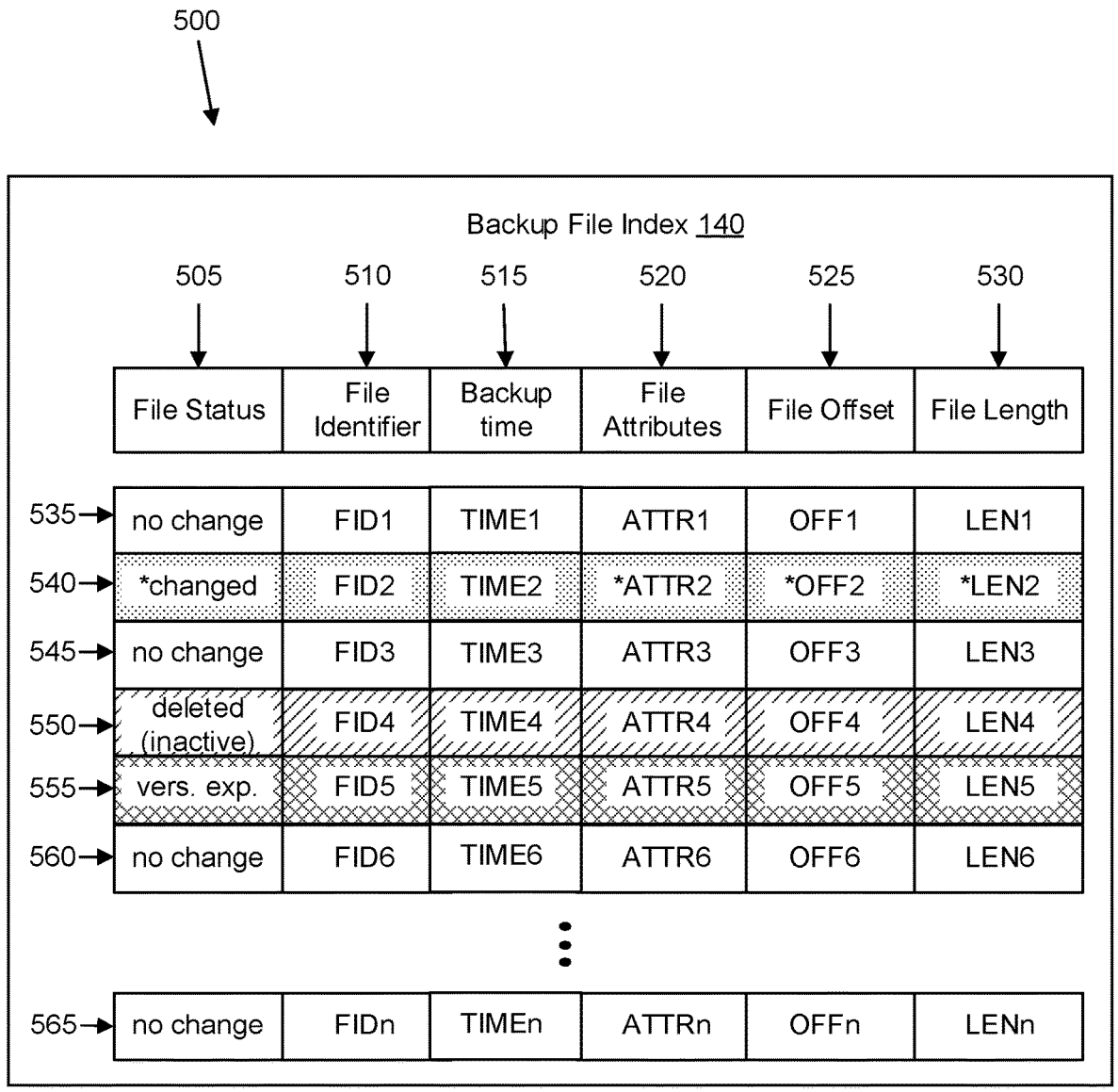
FIG. 5 depicts records of a backup file index in table format for various file statuses.

FIG. 5 depicts records of a backup file index 140 in table format. The table depicts records for files having various file statuses 505. The file status 505 indicates whether a file has changed, not changed, been deleted, or expired between a previous backup and a current backup. The file status 505 may be merely an annotation in the depiction of the backup file index 140 rather than a field in the records (e.g. 535, 540, 545, 550, 555, 560, and 565). In some embodiments, the file status 505 may be included as a field in the records. The term current attributes, as used herein, refers to the attributes of the files corresponding to the changed blocks copied from the virtual disk 120 at the time of a current backup.

Performing a current backup copies blocks from the virtual disk 120 to the backup storage device 155. File access module 130 enables access to the files corresponding to the changed blocks of the current backup. Thus, the current attributes of the changed files can be read from the blocks copied to backup storage device 155. In some embodiments, file identifier 510 refers generally to a name of a file. In some embodiments, a file name can be changed while file identifier 510 remains the same. In some embodiments, table 500 includes a backup time 515 where a time the backup was performed for a record in the index is recorded. In some embodiments.

In one embodiment, table 500 includes file attributes 520 for files on virtual disk 120 at the backup time 515 of one or more block-level backups. Copies of the same files or same blocks made at different backup times 515 may be referred to as versions. In some embodiments, as depicted on record 535 of table 500, the changed file module 215 accesses file attributes 520 for the copy of file FID1 in the blocks of the backup storage device 155 and determines that the previous file attributes 520 in record 535 match the current attributes of file FID1. Accordingly, update module 305 does not update record 535 of backup file index 140 with changed attributes and/or with a changed offset OFF1 and changed file length LEN1 since the offset OFF1 and the file length LEN1 are already correct because the file has not changed since the previous backup. Similarly records 545, 560, and 565 of table 500 are also left unchanged, as shown in the file status 505 because current attributes of the corresponding files FID3 and FID6 respectively match attributes ATTR3 and ATTR6 as stored in backup file index 140.

In some embodiments, as depicted on record 540 of table 500, the changed file module 215 accesses current attributes for file FID2 and determines that the current attributes do not match the previous attributes of file FID2. This is depicted in file status 505 of record 540. Accordingly, update module 305 does update record 540 of backup file index 140 by replacing the previous attributes with the current attributes, e.g. ATTR2. In some embodiments, the file offset 525 refers to the offset of the file in the blocks of the backup storage device 155. In some embodiments, the backup storage device is a volume that begins with block zero and the file offset 525 is relative to block zero. File length 530 refers to the length of the file starting from the file offset 525.

Update module 305 may also replace a previous file offset 525 with a current file offset 525, e.g. OFF2 if the file offset determined and changed file length LEN2. In some cases, the attributes of a file have changed but the offset OFF2 and/or the length LEN2 have not changed since the previous backup and thus do not need to be overwritten. In some embodiments, as depicted on record 550 of table 500, the deletion module determines that the file FID4 has been deleted on virtual disk 120 since a previous backup. The update module 305 may designate file FID4 as inactive, as shown in file status 505 of record 550.

In some embodiments, as depicted on record 555 of table 500, a snapshot that includes the file FID6 expires. Expiration module 315 determines that the number of snapshots of blocks of virtual disk 120 saved to backup storage device 155 exceeds a predetermined limits of snapshots and designates file FID6 for deletion from backup file index 140 because the snapshot that includes that version of the file is expired, as shown in file status 505 of record 555, and no longer available from backup storage device 155.

In some embodiments, an expiration limit on the number of versions of a particular file may be different from an expiration limit on snapshots. For example, a backup manager 150 may have a limit of 1 copy for very large files such as video files and the like. In some embodiments, the expiration module 315 deletes files that exceed a file expiration limit from the backup file index 140.

Figure 6:
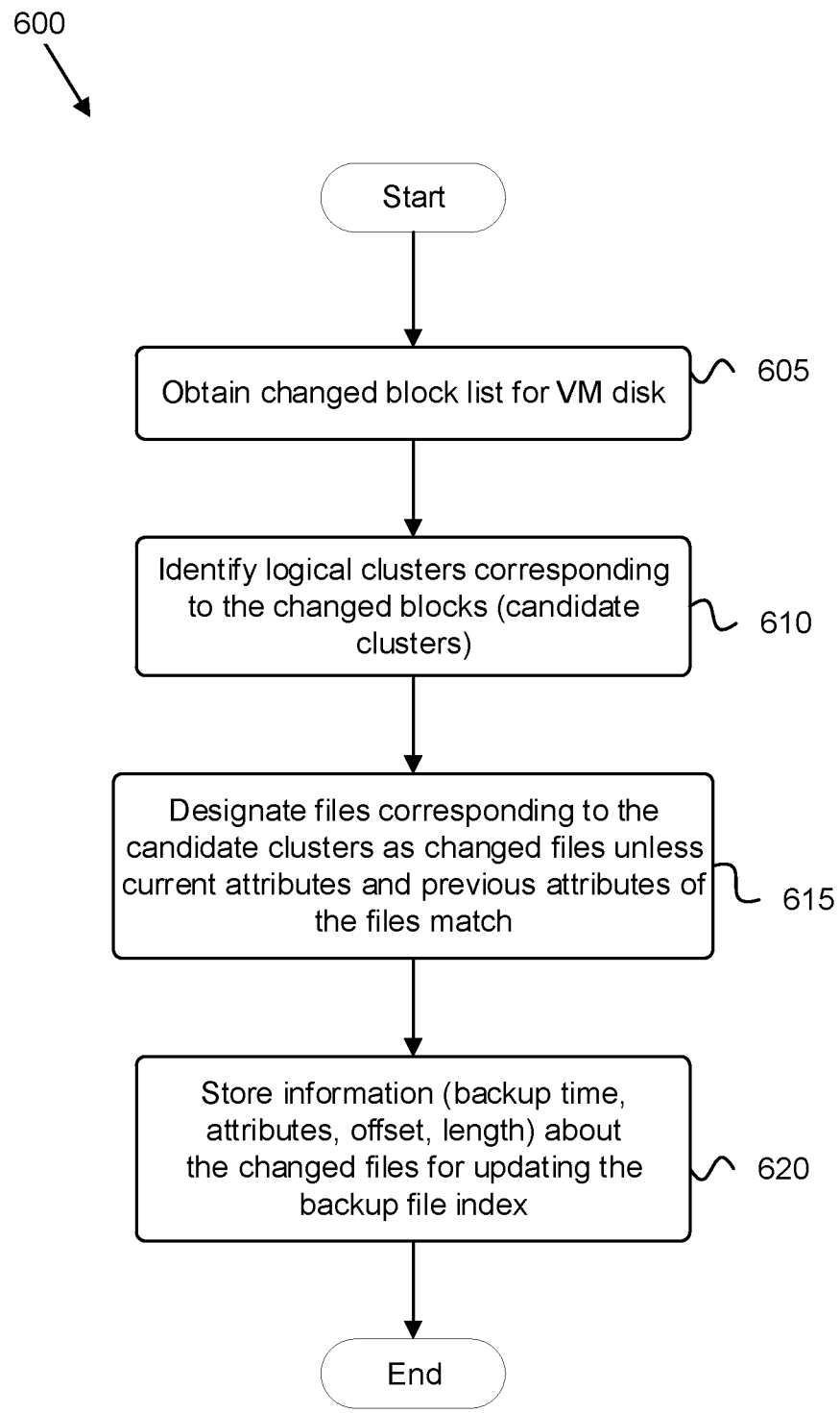
FIG. 6 is a schematic flow chart diagram illustrating one embodiment of a method for accessing files from block-level backup data.

FIG. 6 is a schematic flow chart diagram illustrating one embodiment of a method 600 for accessing files from block-level backup data. In one embodiment, the method 600 begins and obtains 605 a list of blocks 405 that have changed since the previous backup. In some embodiments, the changed block module 205 obtains the list of blocks changed since a previous substantially as described above with respect to the description of the operation of the changed block module 205 as shown in FIGS. 2, 3, and 4.

In one embodiment, the method 600 identifies 610 logical clusters corresponding to the changed blocks. In some embodiments mapping module 210 performs the identifying substantially as described above with respect to FIGS. 2, 3, and 4. In one embodiment, the method 600 further designates 615 files corresponding to the logical clusters as changed files, unless current attributes of the files match attributes of the files in a backup file index 140 corresponding to the previous backup.

In one embodiment, the method 600 stores 620 the current attributes of the changed files for updating in the backup file index, and further stores extents of the changed files within blocks of a backup storage for updating in the backup file index 140. In one embodiment, changed file module 215 performs the storing 620 of the updated file information substantially as described above with respect to FIGS. 2, 3, and 4.

In some embodiments, the obtaining 605, identifying 610, designating 615, and storing 620 of method 600 are performed where the virtual disk is unmounted to the backup server. For example, in some embodiments, the changed block tracking, and cluster mapping information is obtained from the backup database 145. The similarly, the current file attributes 520 can be accessed from the backup storage device 155, at the file offset within the changed blocks of a current backup. Thus, method 600 ends.

Figure 7:
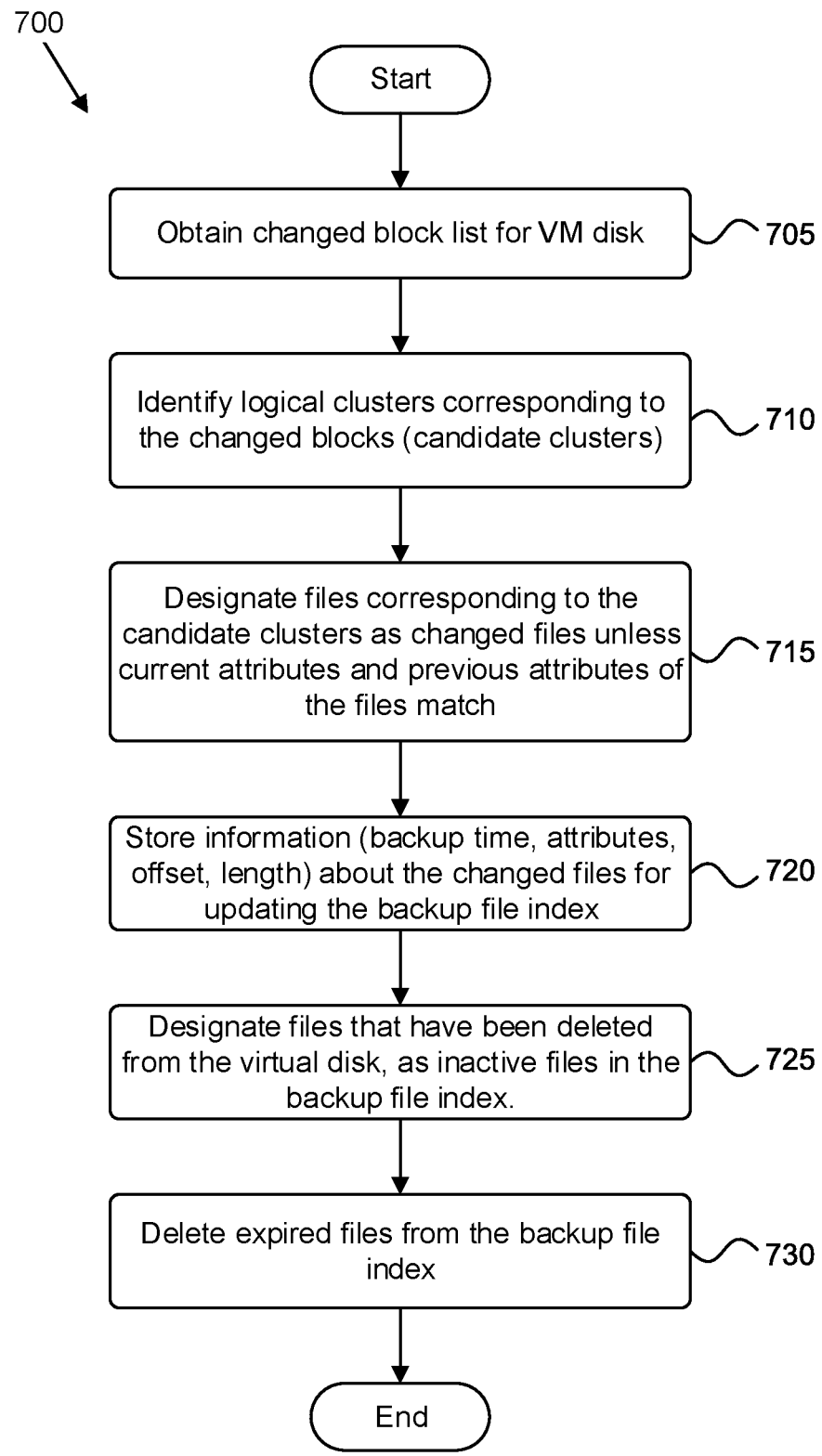
FIG. 7 is a schematic flow chart diagram illustrating another embodiment of a method for accessing files from block-level backup data.

FIG. 7 is a schematic flow chart diagram illustrating another embodiment of a method for accessing files from block-level backup data. In one embodiment, method 700 includes obtaining 705, identifying 710, designating 715, and storing 720 that are substantially similar to the embodiments of the obtaining 605, identifying 610, designating 615, and storing 620 of method 600 as described above with respect to FIG. 6. In some embodiments, method 700 further includes designating 725 files that have been deleted from the virtual disk 120, as inactive files in the backup file index 140. In some embodiments, method 700 further includes deleting 730 expired files from the backup index. In some embodiments, method 700 performs the designating 725 and deleting 730 substantially as described with respect to deletion module 310 and expiration module 315 depicted in FIGS. 3 and 5.

In some embodiments, a computer program product transforms block-level backup data from virtual disks to file-level backup information substantially as described above with respect to FIGS. 2-7. In one embodiment, the computer program product includes a computer readable storage medium having program instructions that are readable/executable by a processor to cause the processor to perform embodiments of method 600 and method 700 as described above with respects to FIGS. 6 and 7.

The embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A system, comprising:
   one or more virtual disks;
   a backup server configured to perform a block-level backup of the one or more virtual disks;
   a deletion module that finds files that were deleted after a previous block-level backup and designates the deleted files as inactive files in a backup file index, the inactive files retaining respective offsets and lengths for their corresponding deleted files; and
   a file access module that enables the backup server to restore the deleted files without performing file-level backups by using the retained respective offsets and lengths for the inactive files in the backup file index corresponding to their deleted files within blocks of the block-level backup.

2. The system of claim 1, wherein the backup server restores the deleted files from a plurality of snapshots backed up at different times without mounting the one or more virtual disks.

3. The system of claim 2, wherein the backup server comprises a backup manager configured to perform the block-level backup using one or more backup modes selected from the group consisting of a full block-level backup, an incremental block-level backup, and an incremental forever block-level backup.

4. The system of claim 3, further comprising a data mover implemented on a second server separate from and in network communication with the backup server, wherein the backup manager sends a request to the data mover to perform the block-level backup of the one or more virtual disks.

5. The system of claim 1, wherein the file access module comprises:
   a changed block module that obtains a list of changed blocks for a current block-level backup of the one or more virtual disks, wherein the list of changed blocks indicates data blocks of the one or more virtual disks that have changed since the previous block-level backup of the one or more virtual disks;
   a mapping module that:
      determines candidate clusters by mapping logical clusters of the one or more virtual disks to the changed blocks; and
      identifies candidate changed files corresponding to the candidate clusters; and
   a changed file module that marks records for the candidate changed files in the backup file index as changed files and stores a file offset relative to a start of the corresponding changed blocks in the block-level backup, and a file length, to records of the backup file index in response to determining that current file attributes of the candidate changed files differs from previously-stored file attributes in a file attribute field of the records of the backup file index, and further updates the file attribute field with the current file attributes.

6. The system of claim 5, wherein the mapping module maps the logical clusters of the virtual disk to file identifiers corresponding to the logical clusters by accessing a file system journal while the virtual disk is unmounted to the backup server.

7. The system of claim 5, wherein the changed file module provides a list of the changed files that includes a plurality of versions of one or more of the changed files that were backed up at different backup times.

8. The system of claim 5, further comprising an update module that:
   determines whether a backup version that includes the changed blocks includes an expiration limit; and
   marks, as the deleted files, files corresponding to the changed files in the backup file index in response to the expiration module determining that the backup version has exceeded the expiration limit.

9. The system of claim 8, wherein the expiration limit comprises one or more of:
   a limit on a number of versions backed up which if exceeded identifies a previously stored version as expired; and
   an expiration date after which a backed up version of the changed blocks is identified as expired.

10. The system of claim 8, wherein the update module further:
   determines whether the updating of the backup file index with the current attributes of the changed files will result in one or more of the changed files having a number of file versions that exceeds the expiration limit; and
   marks, as the deleted files, the files corresponding to an expired version of the changed files from the backup file index in response to determining that the number of file versions saved to the backup storage disk exceeds the expiration limit.

11. A method, comprising:
   finding files on a virtual disk that have been deleted since a previous block-level backup of the virtual disk;
   marking deleted files corresponding to candidate clusters of the deleted blocks as inactive files stored in a backup file index for the previous block-level backup, the inactive files retaining respective offsets and lengths for their corresponding deleted files; and
   restoring the deleted files without performing file-level backups by using the retained respective offsets and lengths for the inactive files in the backup file index corresponding to their deleted files within blocks of the block-level backup.

12. The method of claim 11, wherein the block-level backups comprise one or more of full backups, incremental backups, and incremental forever backups.

13. The method of claim 11, wherein restoring the deleted files is performed without mounting the virtual disk to one or more backup servers.

14. The method of claim 11, wherein file identifiers for the files corresponding to the candidate clusters of the deleted blocks are restored without mounting the virtual disk by accessing a file system journal.

15. The method of claim 11, further comprising restoring a plurality of versions of one or more of the deleted files that were backed up at the block level at different backup times.

16. The method of claim 11, further comprising:
   selecting a plurality of deleted files to restore; and
   restoring the selected plurality of deleted files together in a same backup restore operation.

17. The method of claim 11, further comprising:
   updating file records in backup file index results with attributes and extents for changed files based on the updating not exceeding an expiration limit; and
   marking, as the deleted files, file records in the backup file index in response to determining that updating the file records would exceed the expiration limit.

18. A computer program product for recovering files from block-level backup data, the computer program product comprising a computer-readable storage medium including program instructions executable by a processor to cause the processor to:
   find files on a virtual disk that have been deleted since a previous block-level backup of the virtual disk;
   mark deleted files corresponding to candidate clusters of the deleted blocks as inactive files stored in a backup file index for the previous block-level backup, the inactive files retaining respective offsets and lengths for their corresponding deleted files; and
   restore the deleted files without performing file-level backups by using the retained respective offsets and lengths for the inactive files in the backup file index corresponding to their deleted files within blocks of the block-level backup.

19. The computer program product of claim 18, wherein the program instructions further cause the processor to:
   update file records in backup file index results with attributes and extents for changed files based on the updating not exceeding an expiration limit; and
   mark, as the deleted files, file records in the backup file index in response to determining that updating the file records would exceed the expiration limit.

20. The computer program product of claim 18, wherein the program instructions further cause the processor to:
   select a plurality of deleted files to restore; and
   restoring the selected plurality of deleted files together in a same backup restore operation.

* * * * *